United States Patent

Goppelt et al.

[11] Patent Number: 6,089,198
[45] Date of Patent: Jul. 18, 2000

[54] DEVICE FOR VARYING THE OPENING AND CLOSING TIMES OF GAS EXCHANGE VALVES OF AN INTERNAL COMBUSTION ENGINE

[75] Inventors: Dieter Goppelt, Aurachtal; Mike Kohrs, Wilthen; Jochen Auchter, Aurachtal; Joachim Matuschka, Emskirchen, all of Germany

[73] Assignee: INA Walzlager Schaeffler oHG, Germany

[21] Appl. No.: 09/060,125

[22] Filed: Apr. 14, 1998

[30] Foreign Application Priority Data

Apr. 18, 1997 [DE] Germany .......................... 197 16 203

[51] Int. Cl.[7] ................................................. F01L 1/344
[52] U.S. Cl. ..................... 123/90.17; 123/90.31; 74/568 R; 464/2; 464/161
[58] Field of Search ............................. 123/90.15, 90.17, 123/90.31; 74/568 R; 464/1, 2, 160, 161

[56] References Cited

U.S. PATENT DOCUMENTS

| 5,377,639 | 1/1995 | Nakadouzono et al. | 123/90.17 |
| 5,738,056 | 4/1998 | Mikame et al. | 123/90.17 |
| 5,775,279 | 7/1998 | Ogawa et al. | 123/90.17 |

FOREIGN PATENT DOCUMENTS

| 4321003 | 1/1995 | Germany . |
| 19541769 | 5/1997 | Germany . |
| 19630174 | 1/1998 | Germany . |
| 2302391 | 1/1997 | United Kingdom . |

Primary Examiner—Weilun Lo
Attorney, Agent, or Firm—Bierman, Muserlian and Lucas

[57] ABSTRACT

A device for varying the opening and closing times of gas exchange valves of an internal combustion engine, comprising a drive unit (2) which is in driving relationship with a crankshaft through a traction element and a driven unit (14) connected to an intake or exhaust camshaft, there being arranged within the device (1), a coupling element (18) by which a rotationally fixed, force-transmitting connection can be established between the drive unit (2) and the driven unit (14) when the pressure of the hydraulic medium falls below a level required for the displacement of the adjusting piston (9), the coupling element (18) being configured as a locking piston (19) which can be displaced on the one hand by hydraulic pressure and on the other hand by an auxiliary energy and comprises on an end face (26) a number of concentrically arranged extensions (27) which are associated to complementary recesses (35) of a locking ring (34) in the housing (6) to avoid noise generation on starting of the internal combustion engine caused by an inadequate hydraulic clamping-in of the adjusting piston (9).

18 Claims, 3 Drawing Sheets

DEVICE FOR VARYING THE OPENING AND CLOSING TIMES OF GAS EXCHANGE VALVES OF AN INTERNAL COMBUSTION ENGINE

FIELD OF THE INVENTION

A device for varying the opening and closing times of gas exchange valves of an internal combustion engine, comprising a drive unit which is in driving relationship with a crankshaft through a traction element and a driven unit rotationally fixed to an intake or exhaust camshaft, said drive unit being comprised of a drive pinion and a housing fixed thereon, an adjusting piston which is axially displaceable by a hydraulic pressure medium between two end positions being sealingly guided on an inner wall of said housing while axially delimiting two pressure chambers which can be connected alternately or simultaneously to a pressure medium feed duct and a pressure medium drain duct, said adjusting piston being made in one piece with a hollow cylindrical sliding sleeve comprising, on an inner peripheral surface, a first helical gear section and, axially spaced therefrom, an oppositely oriented, second helical gear section, the first gear section cooperating with a complementary outer gearing of a gear hub which is rotationally fixed on the drive pinion, and the second helical gear section cooperating with a complementary outer gearing on the driven unit.

BACKGROUND OF THE INVENTION

In a device of the above type known from DE-OS 43 21 003, the problem that arises on starting of the internal combustion engine, is the adjusting piston moves at a high speed into a position of maximum displacement in which its repeated abutting is accompanied by a considerable amount of noise. This is due to the fact that, when the engine has been turned off, the hydraulic medium contained in the device gradually escapes therefrom so that the adjusting piston is no longer sufficiently supported hydraulically although, as a rule, a certain residual amount of hydraulic medium is still present. Due to the torsional vibrations of the camshaft, the adjusting piston, which is now no longer hydraulically supported, is displaced into an end position on re-starting of the engine, with the already mentioned considerable noise generation. This state prevails during the period of time between the ignition of the engine and the filling of the pressure chambers, that is to say, for a few seconds after the engine has been started.

OBJECTS OF THE INVENTION

It is an object of the invention to create a device for varying the opening and closing times of gas exchange valves of an internal combustion engine in which the aforesaid drawbacks are eliminated and the mentioned start rattling and fluctuation of the relative angular position between the camshaft and the crankshaft is avoided, particularly by the use of simple means i.e., with only slight structural modifications.

This and other objects and advantages of the invention will become obvious from the following detailed description.

SUMMARY OF THE INVENTION

The device of the invention for varying opening and closing times of gas exchange valves of an internal combustion engine, comprising a drive unit (2) which is in driving relationship with a crankshaft through a traction element and a driven unit (14) rotationally fixed to an intake or exhaust camshaft, said drive unit (2) being comprised of a drive pinion (3) and a housing (6) fixed thereon, an adjusting piston (9) which is axially displaceable by a hydraulic pressure medium between two end positions being sealingly guided on an inner wall (7) of said housing (6) while axially delimiting two pressure chambers (16, 17) which can be connected alternately or simultaneously to a pressure medium feed duct and a pressure medium drain duct, said adjusting piston (9) being made in one piece with a hollow cylindrical sliding sleeve (10) comprising, on an inner peripheral surface (11), a first helical gear section (12) and, axially spaced therefrom, an oppositely oriented, second helical gear section (13), the first gear section (12) cooperating with a complementary outer gearing (5) of a gear hub (4) which is rotationally fixed on the drive pinion (3), and the second helical gear section (13) cooperating with a complementary outer gearing (15) on the driven unit (14), is characterized in that at least one coupling element (18) is arranged within the device (1) and, when a pressure of the hydraulic medium falls below a level required for a displacement of the adjusting piston (9), said coupling element (18) with the help of an auxiliary energy can establish a rotationally fixed, force-transmitting connection independently of the adjusting piston (9) between the drive unit (2) and the driven unit (14) in one or more relative angular positions of said drive and driven units and can further prevent a displacement of the adjusting piston (9) in an undesired direction of adjustment.

The invention achieves the above objects by the fact that at least one coupling element is arranged within the device and, when the pressure of the hydraulic medium falls below a level required for a displacement of the adjusting piston, said coupling element with the help of an auxiliary energy can establish a rotationally fixed, force-transmitting connection independently of the adjusting piston between the drive unit and the driven unit in one or more relative angular positions of said drive and driven units and can further prevent a displacement of the adjusting piston in an undesired direction of adjustment.

The device of the invention thus has the advantage over prior art devices that, during its substantially pressureless state when the engine is at a standstill, the drive unit and the driven unit are positively connected to each other by an auxiliary force resulting in a locking during ignition which prevents a relative rotation of the drive and driven units. This has the advantageous effect that any axial movement of the adjusting piston out of the position which it has taken in the device on occurrence of the pressureless state is blocked. On the one hand, this eliminates the rattling noises encountered in prior art devices on re-ignition of the engine which are produced by the high-frequency abutments of the adjusting piston in its end positions. On the other hand, the blocking of the adjusting piston prevents the adjusting piston from being displaced in an undesired direction of adjustment immediately upon starting of the engine and from coming into a start position which renders the starting of the engine more difficult or even impossible.

A further significant advantage of the device of the invention is that all the individual components required for the coupling of the drive and driven units, i.e., for the locking of the adjusting piston, have a simple structure and can therefore be made economically by a suitable fabrication method.

To obtain an advantageous start position of the adjusting piston, the invention utilizes the drag and alternating moments of the camshaft acting on the device to effect that the adjusting piston is blocked by the positive connection between the drive unit and the driven unit only after it has taken one of its end positions, that of "retarded" or of "advance" opening of the gas exchange valves concerned. When the device of the invention is used, for example, on an intake camshaft, the end position of the adjusting piston for the starting of the engine should be its "retarded" position which causes a small valve overlap and thus a small amount of residual gas in the cylinder. In the case of the device being used on an exhaust camshaft, in contrast, the start position should be that of an advance opening of the gas exchange valves concerned.

It is of course desirable that the adjusting piston be displaced into its desired position by a hydraulic loading of the pressure chamber concerned immediately before the engine is switched off, but certain states of operation are conceivable in which this is not possible. Such is the case, for instance, when the engine has been running f or a short time only or has come unintentionally to a standstill ("stalling") and has not been started again at once. In this case, a connection between the drive and the driven unit by the coupling element is also not possible so that the adjusting piston is still axially movable for a short time immediately after re-ignition of the engine. However, as soon as the adjusting piston has reached its desired start position for the first time after the re-ignition of the engine, a connection is also established between the drive and the driven unit, and the adjusting piston is held in its start position till the pressure chambers of the device are sufficiently re-filled with hydraulic medium and the adjusting piston is hydraulically clamped-in.

In an advantageous embodiment of the invention, the coupling element is preferably arranged in one of the two pressure chambers or in an adjoining region within the housing of the device and is configured as a locking piston which is hydraulically connected to the pressure chamber concerned and can be hydraulically displaced by an axial guide in a device-distal direction. In contrast, in a direction towards the pressure chamber, the locking piston is axially displaceable by the auxiliary energy produced, preferably by a spring means so that, in the presence of hydraulic medium pressure, the locking piston is retained in a device-distal position and in the absence of pressure, it is pushed by the spring means towards the pressure chamber.

The spring means is configured preferably as a compression spring or an ondular washer surrounding the driven unit and supported between the device-distal inner end face of the housing and the end face of the locking piston remote from the adjusting piston. It is particularly advantageous to dimension the compression spring so that the drive and the driven unit can be uncoupled on application of a maximum hydraulic medium pressure of 0.5 bar on the locking piston so that the adjusting piston becomes displaceable again. Other auxiliary energies may also be used in place of the compression spring or ondular washer for displacing the locking piston. What is important is only that the coupling aimed at by the invention between the drive and the driven unit, and thus the blocking of the adjusting piston, are realized during the starting of the engine and in the absence of hydraulic medium pressure.

According to a further proposition of the invention, the locking piston is configured as a concentric ring with a T-shaped cross-sectional profile comprising at least on a part of the inner peripheral surface of its flange, an axially extending straight or helical gearing to form a part of its axial guide. This locking piston is mounted on a sliding ring fixed rigidly to the driven unit and partially surrounding the same, the sliding ring comprising at least on a part of its outer peripheral surface, a straight or helical gearing complementary to the straight or helical gearing of the locking piston to form a further part of the axial guide of the locking piston. Thus, the locking piston slides with a non-toothed section of the inner peripheral surface of its flange on a non-toothed section of the outer peripheral surface of the sliding ring and is guided axially with a straight or a slightly rotational movement by its toothed section which meshes with the toothed section of the sliding ring.

Whether the axial guide is configured as a straight gearing or as a helical gearing depends on the manner in which the radial play of the locking piston in its locking position is avoided. This will be treated in more detail in the following. Independently thereof, the most suitable type of gearing is a gearing with ondular or wedge-shaped teeth which fulfils its function even when made only on some portions and not over the entire circumference of the surfaces concerned.

According to a further feature of the invention, circumferentially spaced extensions are arranged on the end face of the locking piston situated opposite the adjusting piston and lock positively into complementary recesses of a locking ring which is fixed rigidly on the inner surface of the housing when the pressure level of the hydraulic medium falls below that required for the displacement of the adjusting piston. The locking ring preferably has preferably an L-shaped cross-sectional profile, with one arm comprising the recesses for the extensions of the locking piston while the other arm is fixed on the housing, preferably by laser welding, and forms an axial end stop for the adjusting piston in one of its end positions. The extensions on the locking piston and the recesses in the locking ring thus establish the positive connection between the drive unit and the driven unit of the device and are arranged in the same number and spacing on the end face of the locking piston and in the locking ring respectively, so that said connection is only enabled in the end position corresponding to the desired start position.

However, by an arrangement of additional recesses in the locking ring, it is also possible to block the adjusting piston in an intermediate position between the end positions if this is permitted by the starting behavior of the engine. It is likewise possible, in an equivalent embodiment of the invention, to arrange suitable recesses in place of the extensions on the locking piston and corresponding extensions on the locking ring in place of the recesses. A possibility of adjustment between the drive unit, the locking piston and the driven unit for obtaining an exact locking in the desired start position can then be realized by providing slots for the screws used to connect the drive pinion to the housing.

Since, for reasons of operation, the recesses of the locking ring have to have a certain radial play to the extensions of the locking piston, slight rattling noises may also occur in the locking position of the device of the invention on starting of the engine. In a further embodiment of the invention, it is therefore proposed to make the axial guide of the locking piston preferably as a straight gearing and, in combination therewith, to give the concentric extensions of the locking piston and the recesses of the locking ring a conical configuration so that when the extensions and recesses approach each other in a rectilinear movement, they are connected without play in both radial directions in their position of locking. To assure a play-free locking, the angle of cone should be chosen in the self-locking range because, otherwise, the thrust force resulting from the alternating moments of the camshaft could cause a spontaneous release of the locking.

Alternatively, it can be advantageous, especially from the manufacturing point of view, to use a slightly helical gearing for the axial guidance of the locking piston because the concentric extensions of the locking piston as also the recesses of the locking ring can then be made more simply, preferably with a square or rectangular configuration. A clearance-free locking is then established in one of the radial directions by the slight screwing-in of the extensions into the recesses because this causes a direct effective contact between one lateral surface of each of the recesses and of the extensions. In the other radial direction, the clearance-free locking is effected through the adjusting piston of the device then situated in an end position ("advance" or "retarded").

In both cases, the locking position of the locking piston is pre-defined so that not only the opposite radial surfaces of the extensions of the locking piston and of the recesses of the locking ring, but also the end face of the locking piston opposite the adjusting piston and one arm of the locking ring are spaced from one another. Due to this spacing, wear occurring in operation in the contact region between the extensions and the recesses can be automatically compensated i.e., by the pressure of the compression spring acting on the locking piston.

According to a final proposition of the invention, sealing means of a type, known,. per se, can be used for a radially inner and outer sealing of the locking piston relative to adjacent components such as the housing of the device and the sliding ring on which said piston is mounted, so that the hydraulic clamping-in of the adjusting piston without leakages is also assured in the device of the invention. The sealing of the locking piston relative to the housing is preferably effected by a piston sealing ring arranged in an end annular groove. However, this may also be replaced by an elastomer sealing ring. For the sealing of the locking ring relative to the sliding ring, a narrow sealing gap has proved to be the most advantageous. Alternatively, an elastic double-lip sealing ring may be used which is then arranged in a circumferential groove on the inner periphery of the device-distal portion of the flange of the locking piston, in which case, said portion is configured slightly thicker than usual.

DETAILED DESCRIPTION OF THE DRAWINGS

Figure 1A:
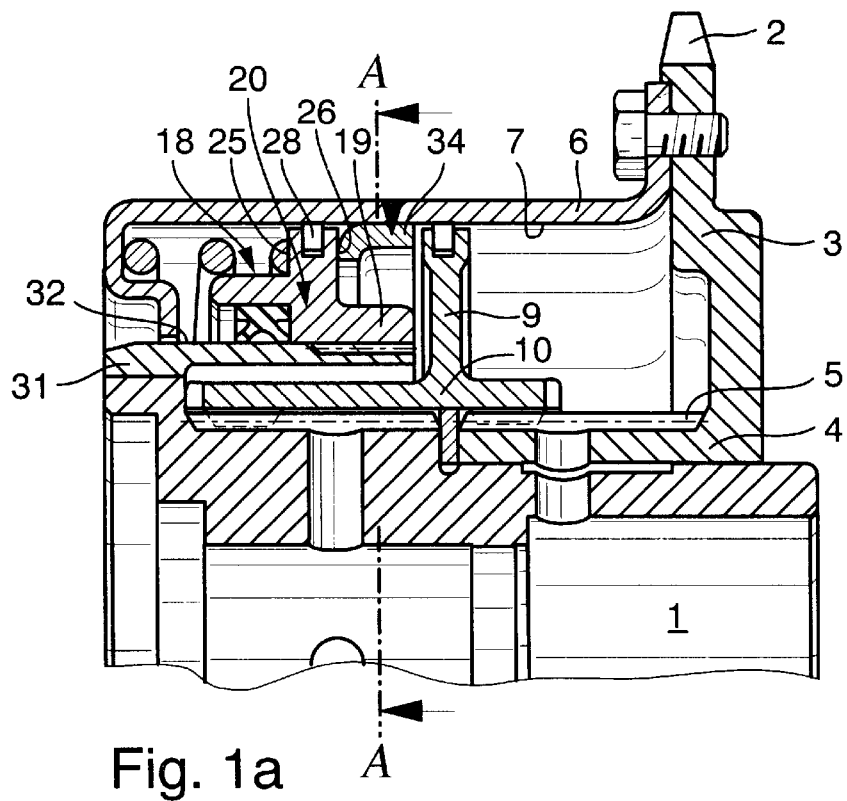
FIGS. 1a and 1b are longitudinal cross-sections through a device for a chain drive equipped with a start blocking of the invention.

Each of FIGS. 1 and 2 shows a device 1 for varying the opening and closing times of gas exchange valves of an internal combustion engine. The device 1 comprises a drive unit 2 which is in driving relationship with the crankshaft through a traction element, not shown, and a driven unit 14 rotationally fixed to an intake or exhaust camshaft, not shown either, said drive unit 2 being comprised of a drive pinion 3 and a housing 6 fixed thereon. An adjusting piston 9 which is axially displaceable by a hydraulic pressure medium between two end positions is sealingly guided on an inner wall 7 of the housing 6 and axially delimits two pressure chambers 16, 17 which can be connected alternately or simultaneously to a pressure medium feed duct and a pressure medium drain duct, said adjusting piston 9 being made in one piece with a hollow cylindrical sliding sleeve 10.

The end positions of the adjusting piston are shown in FIGS. 1a, 1b, 2a and 2b, respectively. On its inner peripheral surface 11, the sliding sleeve 10 comprises two axially spaced and oppositely oriented helical gear sections 12, 13, the first of these gear sections 12 cooperating with a complementary outer gearing 5 of a gear hub 4 which is rotationally fixed on the drive pinion 3, while the second gear section 13 cooperates with a complementary outer gearing 15 of the driven unit 14.

As mentioned in the discussion of advantages, during the starting of the internal combustion engine, it is necessary to hold the adjusting piston 9 in an advantageous start position till the device 1 has been sufficiently refilled with hydraulic pressure medium. This preferred start position is one of its end positions, and in the instant case, it is the end position shown in FIGS. 1a and in 2b.

To hold the adjusting piston 9 in this position, according to the invention, at least one coupling element 18 is arranged in the device and, when the pressure of the hydraulic medium falls below the level required for a displacement of the adjusting piston, said coupling element with the help of an auxiliary energy can establish a rotationally fixed, force-transmitting connection independently of the adjusting piston 9 between the drive unit 2 and the driven unit 14 in one or more relative angular positions of said drive and driven units and it can further prevent a displacement of the adjusting piston 9 in an undesired direction of adjustment.

Figure 1B:
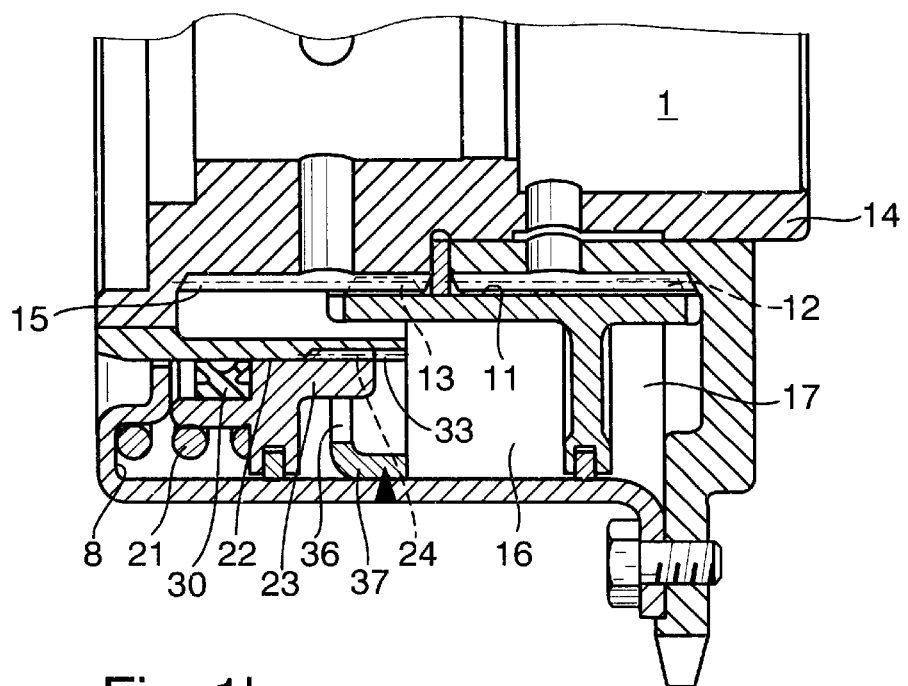
Figure 2A:
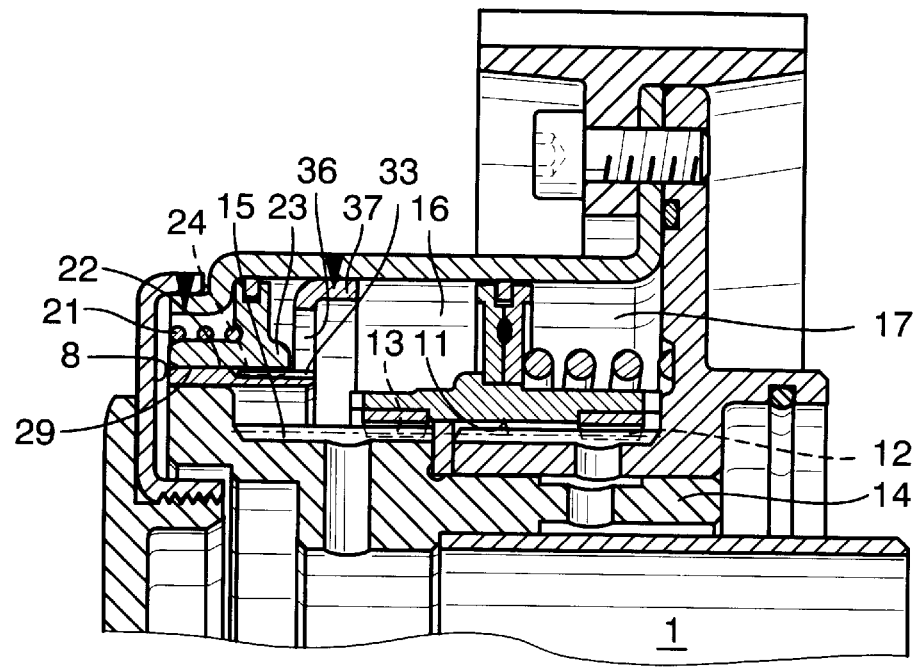
FIGS. 2a and 2b are longitudinal cross-section through a device for a belt drive equipped with a start blocking of the invention.
Figure 2B:
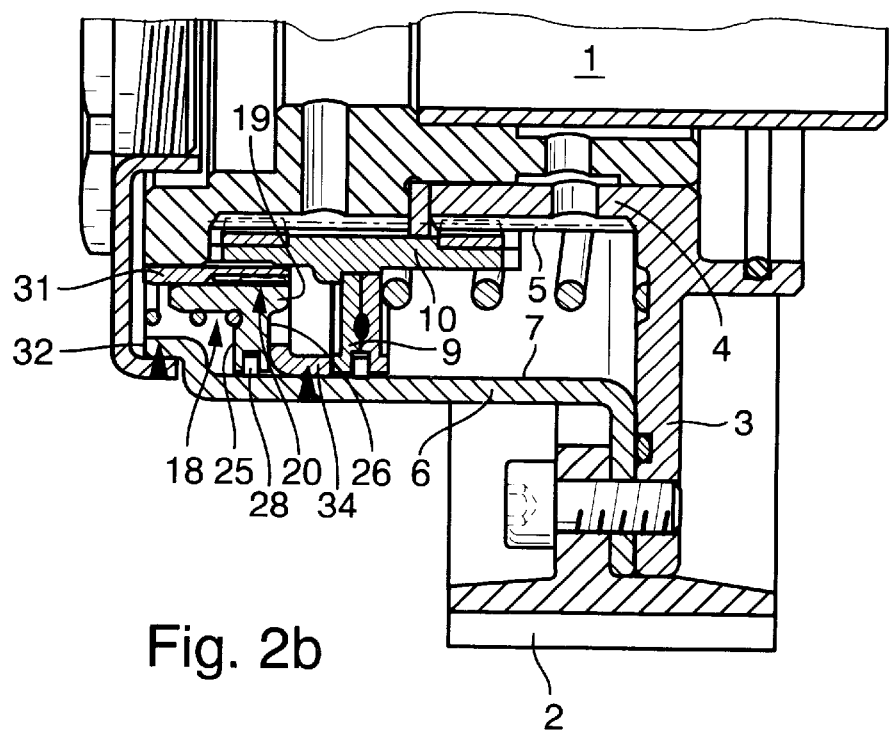

FIGS. 1 and 2 also show that the coupling element 18 is arranged in the region adjoining the pressure chamber 16 within the housing 6 of the device 1 and is configured as a locking piston 19 which is hydraulically connected to the pressure chamber 16 and can be displaced by hydraulic pressure in a direction away from the device by an axial guide 20. A displacement of the locking piston 19 towards the pressure chamber 16, on the other hand, is effected by the auxiliary energy produced by a spring means 21 so that, in the presence of hydraulic pressure, the locking piston 19 is retained in the device-remote position shown in FIG. 1b, and in FIG. 2a, while in the absence of pressure, it is displaced by the spring means 21 towards the pressure chamber 16. In the present example, the spring means 21 for producing the auxiliary energy is a compression spring surrounding the driven unit 14 and supported between the device-distal end face 8 of the housing 6 and the end face 25 of the locking piston 19 remote from the adjusting piston 9.

The drawings further show that the locking piston 19 is configured as a concentric ring with a T-shaped cross-section which comprises at least on a part of its inner peripheral surface 22, an axial, straight or helical gearing 24 which forms a part of its axial guide 20. A further part of the axial guide 20 is arranged on a sliding ring 31 which is rigidly fixed to and at least partly surrounds the driven unit 14, the locking piston 19 being mounted on this sliding ring 31 which comprises at least on a part of its outer peripheral surface 32, a straight or helical gearing 23 which is complementary to the straight or helical gearing 24 of the locking piston 19.

Figure 3:
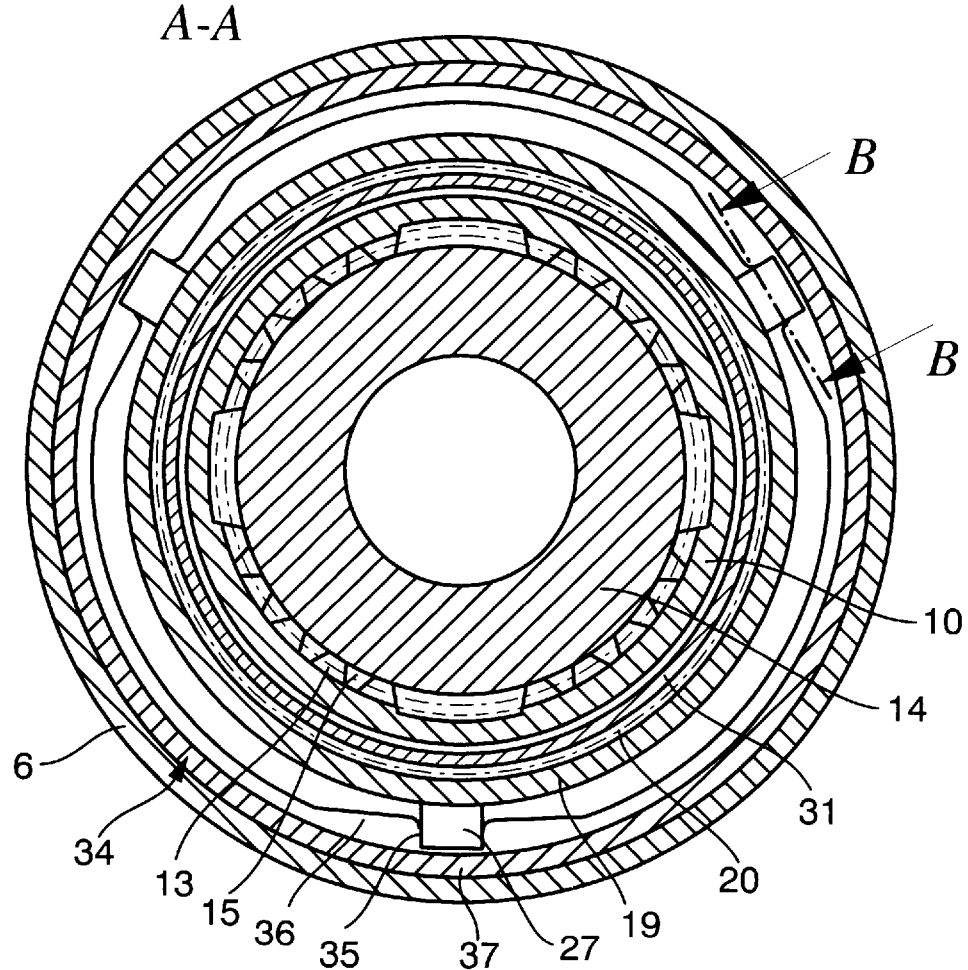
FIG. 3 is a section taken along line I—I of FIG. 1.

To establish a rotationally fixed, force-transmitting connection independently of the adjusting piston 9 between the drive unit 2 and the driven unit 14 in one or more relative angular positions of said drive and driven units, extensions 27, better visible in FIG. 3, are arranged on the end face 26 of the locking piston 19 opposite the adjusting piston 9. When the pressure of the hydraulic medium falls below the level required for a displacement of the adjusting piston 9, the extensions 27 are positively locked with complementary recesses 35 provided in a locking ring 34 which is rigidly fixed to the inner wall 7 of the housing 6. This locking ring 34 has an L-shaped cross-section whose one arm 36 comprises the recesses 35 for the extensions 27 of the locking piston 19 and whose other arm 37 is fixed to the housing 6 by a laser weld, roughly indicated in FIGS. 1a, 1b and 2a, 2b.

Figure 4:
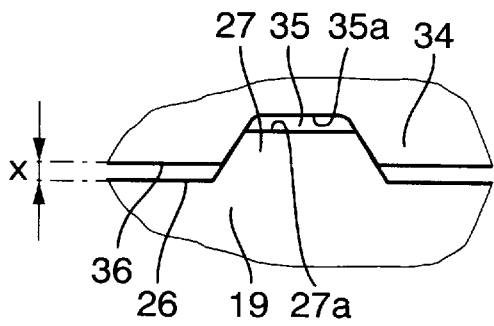
FIG. 4 is a section taken along line II—II of FIG. 3 showing a straight-tooth axial guide of a locking piston.

FIG. 4 further shows that in combination with the straight gearing of the axial guide 20 of the locking piston 19, the concentric extensions 27 of the locking piston 19 and the recesses 35 of the sliding ring 34 are given a conical configuration to avoid a radial clearance therebetween so that, when the extensions 27 and the recesses 35 approach each other linearly, they are connected without play in both radial directions in their locking position when the angle of cone is configured in the self-locking range.

Figure 5:
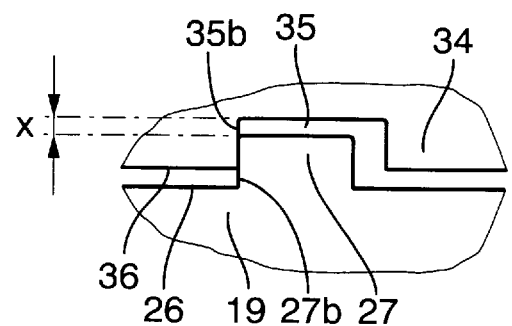
FIG. 5 is a section taken along line II—II of FIG. 3 showing a helical-tooth axial guide of a locking piston.

If, in contrast, the axial guide 20 of the locking piston 19 is made as a helical gear, the concentric extensions 27 of the locking piston 19 and the recesses 35 of the locking ring 34 have a square or rectangular shape as can be seen in FIG. 5. In the locking position shown in the figure, the extensions 27 and recesses 35 are connected without radial clearance in one direction by the direct effective contact between one lateral surface 27b of the extensions 27 and one lateral surface 35b of the recesses 35. In the other radial direction, clearance-free locking is effected through the adjusting piston 9 which is situated in an end position.

In both cases, the opposite straight radial surfaces 27a and 35a of the extensions 27 of the locking piston 19 and of the recesses 35 of the locking ring 34 respectively, as also the end face 26 of the locking piston 19 opposite the adjusting piston 9 and one arm 36 of the locking ring 34 are spaced from one another in the locking position of the device 1 by a distance "X" referenced in each of FIGS. 4 and 5 only once. Due to this spacing, wear occurring in operation in the contact region between the extensions 27 and the recesses 35 can be compensated automatically.

To assure a practically leak-free hydraulic clamping-in of the adjusting piston 9 in a device 1 of the invention, the locking piston 19 is sealed radially outwardly and inwardly from adjacent components such as the housing 6 and the sliding ring 31 by sealing means. As shown in FIGS. 1 and 2, the sealing of the locking piston 19 relative to the housing 6 is effected by a piston sealing ring 28. The sealing of the locking piston 19 relative to the sliding ring 31, in contrast, can be effected by a double-lip sealing ring 30 as shown in FIG. 1b, or by a sealing gap 29 as shown in FIG. 2a.

Various modifications of the embodiments of the invention may be made without departing from the spirit or scope thereof and it is to be understood that the invention is intended to be limited only as defined in the appended claims.

What we claim is:

1. A device for varying opening and closing times of gas exchange valves of an internal combustion engine, comprising a drive unit (2) which is in driving relationship with a crankshaft through a traction element and a driven unit (14) rotationally fixed to an intake or exhaust camshaft, said drive unit (2) being comprised of a drive pinion (3) and a housing (6) fixed thereon, an adjusting piston (9) which is axially displaceable by a hydraulic pressure medium between two end positions being sealingly guided on an inner wall (7) of said housing (6) while axially delimiting two pressure chambers (16, 17) which can be connected alternately or simultaneously to a pressure medium feed duct and a pressure medium drain duct, said adjusting piston (9) being made in one piece with a hollow cylindrical sliding sleeve (10) comprising, on an inner peripheral surface (11), a first helical gear section (12) and, axially spaced therefrom, an oppositely oriented, second helical gear section (13), the first gear section (12) cooperating with a complementary outer gearing (5) of a gear hub (4) which is rotationally fixed on the drive pinion (3), and the second helical gear section (13) cooperating with a complementary outer gearing (15) on the driven unit (14), characterized in that at least one coupling element (18) is arranged within the device (1) and, when a pressure of the hydraulic medium falls below a level required for a displacement of the adjusting piston (9), said coupling element (18) with the help of an auxiliary energy can establish a rotationally fixed, force-transmitting connection independently of the adjusting piston (9) between the drive unit (2) and the driven unit (14) in one or more relative angular positions of said drive and driven units and can further prevent a displacement of the adjusting piston (9) in an undesired direction of adjustment.

2. A device of claim 1 wherein the drive unit (2) and the driven unit (14) can be coupled by the coupling element (18) in one of the end positions of the adjusting piston (9).

3. A device of claim 1 wherein the coupling element (18) is arranged in one of the two pressure chambers (16, 17) or in an adjoining region within the device (1), said coupling element (18) is hydraulically connected to the one pressure chamber (16 or 17) concerned and is axially displaceable by an axial guide (20).

4. A device of claim 1 wherein the coupling element (18) is configured as a locking piston (19) which is displaceable in a device-distal direction by hydraulic pressure and in a pressure chamber direction by auxiliary energy produced by a spring means (21).

5. A device of claim 3 wherein the coupling element (18) is configured as a locking piston (19) which is displaceable in a device-distal direction by hydraulic pressure and in a pressure chamber direction by auxiliary energy produced by a spring means (21).

6. A device of claim 5 wherein the locking piston (19) is configured as a concentric ring with a T-shaped cross-sectional profile comprising at least on a part of an inner peripheral surface (22) of a flange (23), an axially extending straight or helical gearing (24) to form a part of the axial guide (20) of the locking piston (19).

7. A device of claim 4 wherein the locking piston (19) is configured as a concentric ring with a T-shaped cross-sectional profile comprising at least on a part of an inner peripheral surface (22) of a flange (23), an axially extending straight or helical gearing (24) to form a part of the axial guide (20) of the locking piston (19).

8. A device of claim 5 wherein the locking piston (19) is mounted on a sliding ring (31) fixed rigidly to the driven unit (14) and partially surrounding the driven unit (14), said sliding ring (31) comprising at least on a part of an outer peripheral surface (32), a straight or helical gearing (33) which is complementary to the straight or helical gearing (24) of the locking piston (19) to form a further part of the axial guide (20) of the locking piston (19).

9. A device of claim 5 wherein one or more circumferentially spaced extensions (27) are arranged on an end face

(26) of the locking piston (19) situated opposite the adjusting piston (9), which extensions (27) lock positively into complementary recesses (35) of a locking ring (34) which is fixed rigidly on the inner wall (7) of the housing (6) when a pressure level of the hydraulic medium falls below that required for the displacement of the adjusting piston (9).

10. A device of claim 5 wherein the locking piston (19) is sealed radially outwardly and inwardly in leak-free manner from adjoining components.

11. A device of claim 8 wherein a sealing of the locking piston (19) relative to the housing (6) is effected by a piston sealing ring (28), and a sealing of the locking piston (19) relative to the sliding ring (31) is effected by a sealing gap (29) or a double-lip sealing ring (30).

12. A device of claim 4 wherein spring means (21) for producing the auxiliary energy for the locking piston (19) is configured as a compression spring surrounding the driven unit (14) and is supported between a device-distal inner end face (8) of the housing (6) and an end face (25) of the locking piston (19) remote from the adjusting piston (9).

13. A device of claim 5 wherein spring means (21) for producing the auxiliary energy for the locking piston (19) is configured as a compression spring surrounding the driven unit (14) and is supported between a device-distal inner end face (8) of the housing (6) and an end face (25) of the locking piston (19) remote from the adjusting piston (9).

14. A device of claim 9 wherein the locking ring (34) has an L-shaped cross-sectional profile, whose one arm (36) comprises the recesses (35) for the extensions (27) of the locking piston (19) and whose other arm (37) is welded to the housing (6).

15. A device of claim 9 wherein the axial guide (20) of the locking piston (19) is made as a straight gearing and the concentric extensions (27) of the locking piston (19) and the recesses (35) of the locking ring (34) have a conical configuration with an angle of cone situated in a self-locking range so that, on approaching each other in a rectilinear movement, the extensions (27) and the recesses (35) are connected to one another without radial clearance in both radial directions in a locking position thereof.

16. A device of claim 9 wherein the axial guide (20) of the locking piston (19) is made as a helical gearing and the concentric extensions (27) of the locking piston (19) and the recesses (35) of the locking ring (34) have a square or rectangular configuration, the extensions (27) and recesses (35) being connected to each other without radial clearance in a locking position by a direct effective contact between one lateral surface (27b) of each extension (27) and one lateral surface (35b) of each recess (35), and by the adjusting piston (9) situated in an end position.

17. A device of claim 15 wherein, in the locking position of the device (1), a distance "X" is provided between opposite radial surfaces (27a, 35a) of the extensions (27) of the locking piston (19) and of the recesses (35) of the locking ring (34) and also between the end face (26) of the locking piston (19) opposite the adjusting piston (9) and one arm (36) of the locking ring (34), said distance "X" serving to automatically compensate wear occurring in operation in a contact region between the extensions (27) and the recesses (35).

18. A device of claim 16 wherein, in the locking position of the device (1), a distance "X" is provided between opposite radial surfaces (27a, 35a) of the extensions (27) of the locking piston (19) and of the recesses (35) of the locking ring (34) and also between the end face (26) of the locking piston (19) opposite the adjusting piston (9) and one arm (36) of the locking ring (34), said distance "X" serving to automatically compensate wear occurring in operation in a contact region between the extensions (27) and the recesses (35).

* * * * *